(12) United States Patent
Iuzifovich et al.

(10) Patent No.: US 11,194,935 B2
(45) Date of Patent: Dec. 7, 2021

(54) METHOD OF SECURING DEVICES USED IN THE INTERNET OF THINGS

(71) Applicants: Iurii V. Iuzifovich, Monte Sereno, CA (US); Oleg Margulis, Los Gatos, CA (US); Iurii I. Iuzifovich, La Jolla, CA (US)

(72) Inventors: Iurii V. Iuzifovich, Monte Sereno, CA (US); Oleg Margulis, Los Gatos, CA (US); Iurii I. Iuzifovich, La Jolla, CA (US)

( * ) Notice: Subject to any disclaimer, the term of this patent is extended or adjusted under 35 U.S.C. 154(b) by 374 days.

(21) Appl. No.: 15/914,905

(22) Filed: Mar. 7, 2018

(65) Prior Publication Data

US 2019/0278950 A1  Sep. 12, 2019

(51) Int. Cl.
*G06F 21/76* (2013.01)
*G06F 1/16* (2006.01)
*G06F 15/78* (2006.01)

(52) U.S. Cl.
CPC ............ *G06F 21/76* (2013.01); *G06F 1/1658* (2013.01); *G06F 15/7867* (2013.01); *G06F 15/7896* (2013.01)

(58) Field of Classification Search
CPC ...................................................... F06F 13/42
See application file for complete search history.

(56) References Cited

U.S. PATENT DOCUMENTS

| | | | | |
|---|---|---|---|---|
| 2003/0156393 A1* | 8/2003 | Lin | ................ | G01R 31/318516 361/760 |
| 2005/0027409 A1* | 2/2005 | Marshall | ............. | G06F 15/7867 701/13 |
| 2018/0285308 A1* | 10/2018 | Liu | ..................... | G06F 13/4282 |

* cited by examiner

*Primary Examiner* — Jerry Wu

(74) *Attorney, Agent, or Firm* — Keith Kline; The Kline Law Firm PC

(57) ABSTRACT

Secure IoT devices and methods of use are disclosed herein. An example Internet-of-Things (IoT) device includes an interface for transmitting and receiving data on a network; and a chip comprising a reconfigurable hardware core configured to transmit the data using the interface. The reconfigurable hardware core is not vulnerable to malicious attacks can be used to replace a central processing unit (CPU) which is vulnerable to malicious attacks.

5 Claims, 2 Drawing Sheets

METHOD OF SECURING DEVICES USED IN THE INTERNET OF THINGS

FIELD OF THE INVENTION

Embodiments of the present disclosure relate generally to securing devices connected to the internet through the use of removable basic-function components, and more particularly are Internet-of-Things (IoT) devices that are operated using a reconfigurable hardware core.

SUMMARY

Various embodiments of the present disclosure are directed to an Internet-of-Things (IoT) device, comprising: an interface for transmitting and receiving data on a network; and a chip comprising a reconfigurable hardware core configured to transmit the data using the interface.

Various embodiments of the present disclosure are directed to an integrated circuit, comprising: a reconfigurable hardware core, an input/output interface, a power management interface, and a configuration memory module.

Various embodiments of the present disclosure are directed to a method comprising removing a central processing unit and memory from an Internet-of-Things (IoT) device, the central processing unit and memory providing one or more functionalities, and replacing the central processing unit and memory with an integrated circuit comprising a reconfigurable hardware core configured to provide the one or more functionalities.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
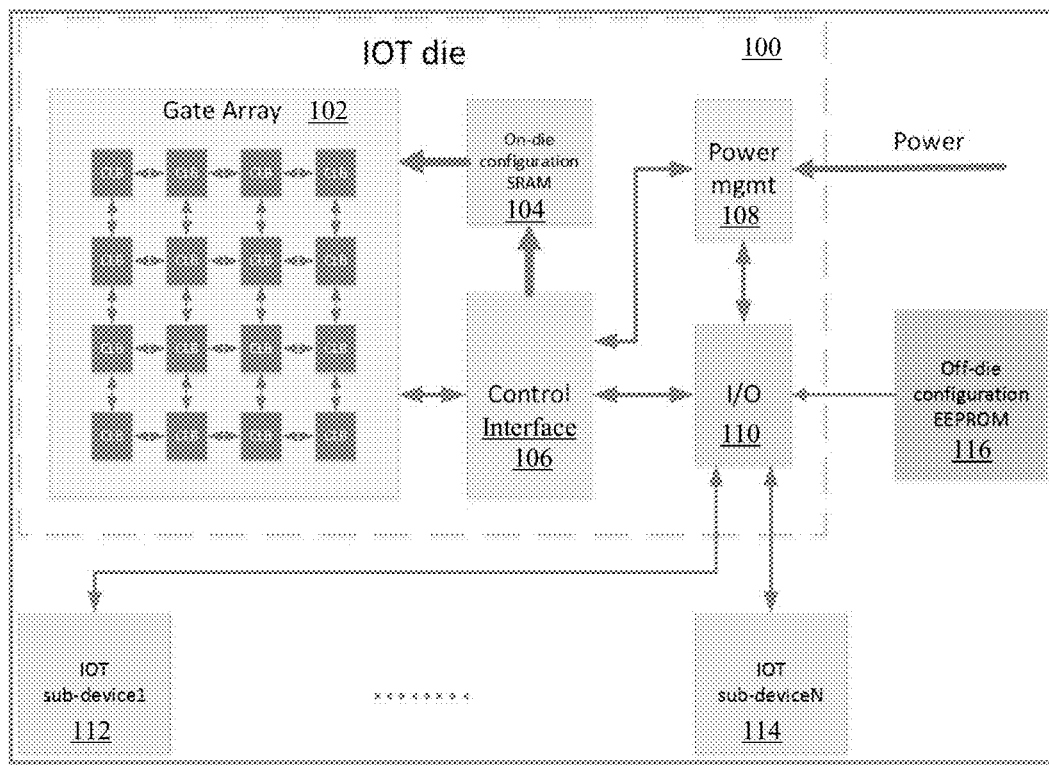
FIG. 1 is a schematic view of an IoT device with a removable chip including a reconfigurable hardware core.

For context, the IoT is the network of physical devices, vehicles, home appliances and other items embedded with electronics, software, sensors, actuators, and connectivity which enable these objects to connect and exchange data. Each thing or device is uniquely identifiable through its embedded computing system but can operate within the existing Internet infrastructure.

Some IoT devices run a full-stack Linux (or another operating system), and may include built-in advanced networking capabilities, running general-purpose CPUs (central processing units) with resident memory. Once they have been installed at an end user, most IoT devices are left without scheduled updates. If update capabilities are included in the device, the update capabilities themselves, in addition to the internet connectivity of the device itself, can become an attack vector. As a result, many household IoT devices become relatively easy targets, being used as botnets that can execute distributed DDoS attacks, data collection, password brute-forcing, and many other malware and illegal use applications.

End-point protection is not typically available or at least utilized for IoT devices, as these devices either do not have sufficient bandwidth to install third party software, or the process of installation is cumbersome enough that most users will not attempt it. The IoT devices are therefore quite vulnerable to hacking attacks.

Most IoT devices do not perform complex enough computations to require the full capabilities of even very basic modern CPUs. For example, an IoT lamp may have its light color and intensity controlled by the server. This control can be relatively simply achieved in the computer-controlled world, and requires only very rudimentary equipment (hardware, software, and/or firmware).

One way to reduce the susceptibility of an IoT device to malware attacks is to replace the general-purpose CPU with an integrated circuit (IC) including a reconfigurable hardware core such as a field programmable gate array (FPGA). All the necessary control functions are encoded into the FPGA. Hardware description languages (such as Verilog, VHDL, and others) are Turing-Complete. This provides the capability of building any desired logic into the FPGA without requiring a CPU. Elimination of a general-purpose computing device inside the IoT device drastically reduces the possibility of turning an IoT device into a complex attacking weapon.

In an IoT device operating with an FPGA and without a CPU, changing the functionality of the device requires physical access to the IoT device to replace the configuration storage "card". This eliminates the possibility of using IoT devices for distributed malicious use, inasmuch as a single IoT device cannot be used for a distributed DDoS attack, or non-volumetric attacks such as infiltration or unauthorized login attempts.

The interface (e.g., card receiver) between the card and the device can be standardized. Many different reconfigurable hardware cores can be utilized. As mentioned above it is envisioned that FPGAs would be utilized as the core in some embodiments. Those skilled in the art will readily recognize that nearly any configuration for the reconfigurable hardware core might be chosen. Any number of electrical contacts and a memory size of the user's choosing would of course be possible to be utilized in the card.

FIG. 1 is a schematic view of an IoT device with a configurable chip 100, embodied as an integrated circuit, including a reconfigurable hardware core 102, an on-die memory module 104, a control interface 106, a power management module 108, and an input/output module 110. It is envisioned that in many embodiments, an FPGA will be used as the reconfigurable hardware core 102. The IoT device is controlled by a card that can only be reconfigured via the reconfigurable hardware core 102, and hence the FPGA. While an FPGA is an example mechanism that serves as the reconfigurable hardware core 102, it is conceivable that other mechanism and methodologies that would be equally suitable may be presently known or may become known to those skilled in the art. Advantageously, an IoT device of the present disclosure is not controlled by a general-purpose CPU executing a software-based code (generally known as "von Neumann architecture"). Elimination of the von Neumann architecture currently used by all IoT devices can function to stop malware attacks and the resultant compromising of IoT devices.

In some embodiments, the reconfigurable hardware core 102 is a gate array. The on-die memory module 104 is a configuration SRAM (Static Random-Access Memory) in some embodiments. The on-die memory module 104 comprises the instructions programmed in a hardware description language. These instructions allow for the one or more functionalities provided by the IoT to a network. Again, one of ordinary skill in the art will appreciate the wide variety of different IoT devices and their respective functions within a network. An example includes an IoT device being programmed with instructions to operate a smart lamp. The IoT device transmits instructions over a network to the smart lamp to control its operations. This can be performed through direct or indirect interface between the IoT device and the smart lamp.

The control interface 106 is used to connect, program and control different blocks of the IoT chip 100. The power management module 108 can include any power transformation and delivery mechanism that is usable within an IoT device. It will be recognized by those skilled in the art that any known mechanism for supplying power to an IoT device may be utilized in conjunction with the present invention. In addition to typical electrical power sources, power over ethernet, power via USB connection, etc. may be utilized to power the device and provide power to the chip 100.

In some embodiments, the configurable chip 100 and related IoT device into which the configurable chip 100 is installed can be used to directly or indirectly control other IoT devices, such as IoT sub-device 112 and IoT sub-device 114. For example, the IoT sub-device 112 might be a hardware component controlled by the configurable chip 100. Examples include, but are not limited to, a lamp, an actuator, a sensor, external physical layer of communication interface such as Ethernet, WiFi, USB, etc.

In some embodiments, a removable memory module 116 can be utilized. In some embodiments, the off-die removable memory module 116 includes an EEPROM module that can be located either in an external card, or in hard-to-replace internal physical storage.

Figure 2:
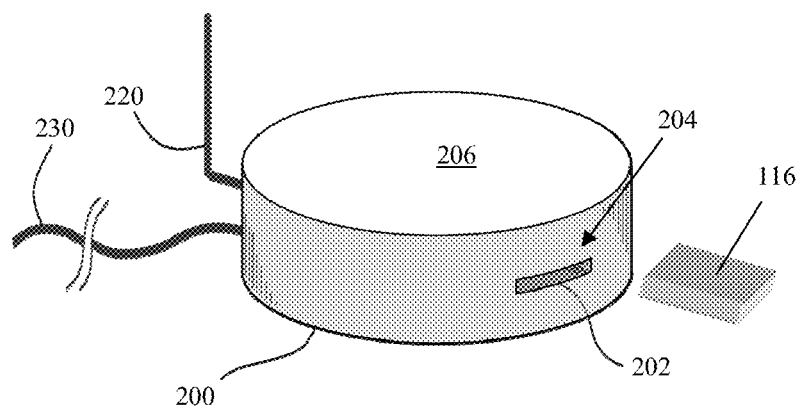
FIG. 2 is a perspective view of a generic IoT device.

FIG. 2 is a perspective view of an example IoT device 200 configured to receive a chip such as the removable chip 116 of FIG. 1, in a chip receiver 202. In this embodiment, the removable chip 116 is embodied within a housing or cartridge. The pins or other contacts used by the removable chip 116, such as the I/O module, can be exposed through the housing. Power can also be delivered through these pins or contacts.

It will be recognized by those skilled in the art that multiple mechanisms can be utilized to receive and secure the removable chip 116 in the chip receiver 210. The retaining mechanisms may be spring loaded, or they may require a further mechanical device to release the removable chip 116, such as a pin being inserted through an access hole. In some instances, a housing 206 of the IoT device 200 includes a slot 204 that aligns with the chip receiver 202.

The IoT device 200 further includes an internet connection 220 and a connection to a power source 230. The internet connection 220 may be, for example only, an antenna for WiFi or cellular connectivity, or a hard wire connector cable for Ethernet, serial, or some other physical layer for connection.

Figure 3:
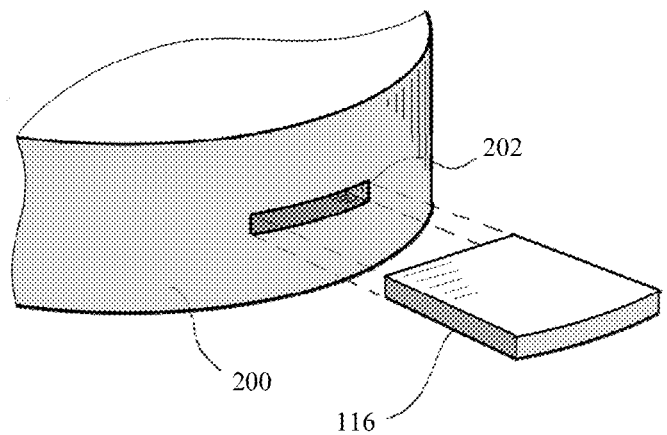
FIG. 3 shows the IoT device with a removable chip of FIG. 1 embodied within a housing/cartridge.

FIG. 3 is a close-up view of FIG. 2, of the IoT device 200 with the removable chip 100 ready to be inserted into the chip receiver 202.

Figure 4:
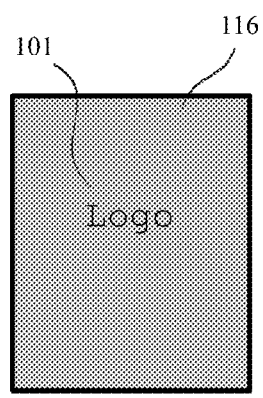
FIG. 4 is a front view of the removable chip.

FIG. 4 is a front view of a removable chip 116 (within its housing) with FPGA or other reconfigurable hardware core. The front of the removable chip 116 can comprise indicia 101 which can be comprise, for example, branding information, a serial number, or any other information that a manufacturer desires to put on the face of the removable chip 116.

Figure 5:
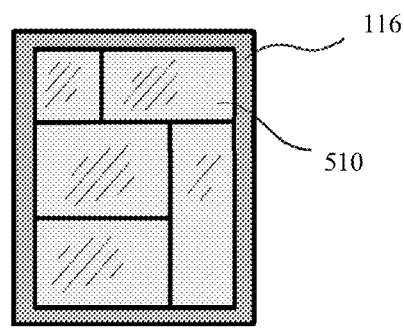
FIG. 5 is a rear view of an example removable chip showing the electrical contacts.

FIG. 5 is a rear view of the removable chip 116 showing multiple electrical contacts 510. It will be readily apparent to those skilled in the art that the number and configuration of the contacts 510 is a matter of choice determined by the needs of the user of the device. Similarly, the geometry of the chip 100 itself is determined by intended use. In some embodiments, the electrical contacts 510 may be situated on a side as opposed to the back of the chip 100.

Another advantage of using the configurable chip 100 of the present invention is that user wishing to upgrade their IoT devices can use mobile units to program the chips. Then, newly programmed chips can replace older chips to enable new functionality from their IoT equipment, thereby extending its useful life.

Also, it will be understood that IoT devices can also comprise dedicated, fixed or embedded chips, rather than requiring the chip to be removable. Thus an IoT device can be manufactured and deployed without need for its reconfigurable hardware core to be removed.

The following example use cases are used to provide further descriptions of example applications of the removable chips of the present disclosure.

Home Routers—Internet Service Providers typically use TR-069 (Technical Report 069) application layer protocol for remote management of customer-premises equipment (CPE) connected to an Internet Protocol (IP) network. However, a variety of vulnerabilities allowed possible Mirai botnet to spread across fixed line networks. If the removable reconfigurable hardware core (e.g., chip) were implemented in home routers, Mirai-type attacks on home routers would be eliminated. This would make household networks more secure for both the subscriber and for the network operator.

Home security cameras, baby and pet monitors. Home security cameras are increasingly being attacked for DDoS and other malicious activity. Most image processing tasks and camera connectivity functionality currently implemented in software can be implemented in the reconfigurable hardware core.

DVRs and other video equipment. Digital Video Recorders are often compromised, and most have enabled remote management protocols. Enabled remote management leads to greater chances of device compromise and exploitation. The concept of separating the user-specific information from the rest of the hardware is actively used by paid satellite content industry, through inexpensive to produce "smart cards".

Smart home IoT devices (thermostats, etc.). Thermostats, sensors, plant watering, pet feeding devices, etc., when compromised, can cease to function properly, even when the target is not the device functionality itself but its internet access. The loss of function of these devices due to the compromise can lead to the damage to the house, or inflict harm to pets.

Toys. Toys are increasingly made "smarter", while security remains an underinvested area of smart toys. Modern toys may include cameras, speech synthesizers, and other equipment, often communicating in real time with Internet. When compromised, these toys may be used against children directly, or to intentionally leak personal information, including images, unauthorized. Protecting toys against security compromise may reduce liability of the toy manufacturers and our invention can address this use case with little additional cost, if any. For toys, memory cards can be tokenized to represent not only upgrades, but also different functionality that can be exchanged between users to enhance play. A physical token that is easier to plug/unplug would be more convenient for children to change/swap.

Other household IoT devices. Household IoT devices explode, from appliances to sensors to door locks. The same principles of better security to prevent unauthorized access to the IoT device, whether the bad actor goal is to alter its behavior and inflict harm to an end user (the entrance lock), or to use its internet connectivity to perform malicious actions (for example DDoS and website password brute force search).

Cars, both driven and autonomous. Security of mission-critical computational elements in cars will become increasingly more important as the cars become autonomously driven. Both trucks (and other non-consumer cars) and consumer cars will greatly benefit from the added security.

Healthcare applications. The compromise of typical IoT devices may not lead to any threat to a human life. Healthcare medical devices, on the other hand, especially internet-connected ones (an example is a sensor of blood pressure or heart monitor that is expected to send an alarm remotely to a nurse or 911), can be especially dangerous when compromised. Even a single compromised device, used for other than the intended purpose, can lead to a human life lost.

Smart agriculture. Smart agriculture can include a variety of internet-connected equipment: ground-based sensors and actuators, autonomous equipment, sensors on the human-controlled equipment, and UAVs (unmanned aerial vehicles) with imaging and spraying capabilities. Ensuring cyber security integrity of these devices will become increasingly important in the future.

Mobile Robots (Industrial). Industrial robots could be a lucrative compromising target due to special capabilities they can perform. Upgrade: similar to when a mobile robot can recharge using special or standard electric outlet, stations could be produced where the reconfigurable hardware core update can be performed physically, via swapping, autonomously by a robot.

Industrial IoT. Manufacturing facilities, smart cities, smart agriculture, etc., if not protected against cyber-attacks, may have a potentially disastrous effect on infrastructure and population. Every city will soon have millions of cameras, sensors, actuators, lights, etc., while perimeter defense and a VPN (virtual private network) can help, compromising one device will present an opportunity to compromise thousands of the devices within the same "protected" network. While industrial IoT are reasonably well protected by a physical perimeter, they are not protected from an insider threat. Smart cities, on the other hand, will leave a lot of their IoT devices exposed and easy to get physical access to (street lights, for example; or drain sensors).

Military applications. FPGA is a popular choice to implement processing required by military applications (for example, FPGA are used for image processing in military applications). As military IoT use increases (sensors, weapons, military equipment), cybersecurity risks can become a major obstacle for IoT use.

DNS client over programmable hardware (FPGA). For simple IoT devices, occasional DNS requests must be performed to know which IP address can be used to communicate with other hosts on the web. A simple use case would be for an internet connected lamp to query DNS to find a server IP that would then be used to periodically query for any updated information about on/off status, and perform switching on/off accordingly.

DNS (domain name system) stub resolver over programmable hardware (FPGA). For more complex IoT devices, where different components may issue DNS requests to a variety of hosts, a DNS stub resolver will provide a unified component to process these requests. The DNS stub resolver will have its own cache. TTL (time to live), DNS over UDP (user datagram protocol), DNS over TCP (transmission control protocol) and DNS over TLS (transport layer security) are covered. Implementation of the DNS stub resolver also enables easier upgrades of the server infrastructure, where TTL is first reduced prior to the server migration, and the downtime of the IoT device would be minimized or eliminated.

Distributed ledgers over programmable hardware (FPGA). IoT devices will increasingly be taking advantages from distributed ledgers where all parties to the communication can verify the chain. Implementing blockchain technology in FPGA for the use of IoT devices will present another solution for cybersecurity challenges such devices would face, further improving security not only of the IoT devices themselves but the robustness and reliability of distributed ledger used by a network of IoT devices.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. An Internet-of-Things (IoT) device, comprising:
an interface for transmitting and receiving data on a network; and
a chip comprising a reconfigurable hardware core configured to transmit the data using the interface, the reconfigurable hardware core being reconfigurable by:
physically removing the chip from the IoT device;
upon removal of the chip, coupling the chip to an off-chip memory module;
receiving, by the reconfigurable hardware core, from the off-chip memory module, instructions to be stored on the reconfigurable hardware core to reconfigure the reconfigurable hardware core;
decoupling the chip with the reconfigured hardware core from the off-chip memory module; and
physically inserting the chip with the reconfigured hardware core into the IoT device; and wherein a functionality of the IOT device is reconfigured only by physical removal of the chip.

2. The IoT device according to claim 1, further comprising a chip receiver that receives the chip, wherein at least a portion of the circuitry of the chip is releasably removable from the chip receiver.

3. The IoT device according to claim 2, further comprising a housing, wherein the housing comprises a slot that aligns with the chip receiver, the chip being inserted through the slot into the chip receiver.

4. The IoT device according to claim 1, wherein the reconfigurable hardware core is a field programmable gate array (FGPA).

5. The IoT device according to claim 1, wherein the reconfigurable hardware core is not a central processing unit or other von Neumann architecture device.

* * * * *